US007179017B2

(12) United States Patent
Rashed

(10) Patent No.: US 7,179,017 B2
(45) Date of Patent: Feb. 20, 2007

(54) LOW-VISCOSITY, SILICONE-MODIFIED PENETRATING ASPHALT SEALER TO ELIMINATE WATER ASSOCIATED PROBLEMS IN ASPHALT PAVEMENTS

(76) Inventor: Radi Al Rashed, 1124 Eton, Richardson, TX (US) 75081

( * ) Notice: Subject to any disclaimer, the term of this patent is extended or adjusted under 35 U.S.C. 154(b) by 0 days.

(21) Appl. No.: 11/121,779

(22) Filed: May 4, 2005

(65) Prior Publication Data

US 2005/0265784 A1    Dec. 1, 2005

Related U.S. Application Data

(60) Provisional application No. 60/569,093, filed on May 7, 2004.

(51) Int. Cl.
  *C08L 95/00* (2006.01)
(52) U.S. Cl. .......................................... 404/17; 106/277
(58) Field of Classification Search ............ 404/17–19, 404/27, 32, 44, 72, 75; 106/277
See application file for complete search history.

(56) References Cited

U.S. PATENT DOCUMENTS

| | | | | |
|---|---|---|---|---|
| 3,060,210 A * | 10/1962 | De Groote et al. | ......... | 507/244 |
| 3,561,334 A * | 2/1971 | Gerosa et al. | ................. | 404/75 |
| 3,802,950 A * | 4/1974 | Stevens | ...................... | 428/215 |
| 3,900,687 A * | 8/1975 | Meader et al. | ............... | 428/215 |
| 3,958,067 A * | 5/1976 | Takase et al. | ............... | 428/402 |
| 4,038,096 A | 7/1977 | Graf et al. | | |
| 4,073,972 A | 2/1978 | Nestler et al. | | |
| 4,139,511 A * | 2/1979 | Hayashi et al. | ............. | 523/450 |
| 4,237,152 A | 12/1980 | Loricchio et al. | | |
| 4,373,960 A | 2/1983 | Ward, Jr. | | |
| 4,410,367 A * | 10/1983 | LeGrand | ................ | 106/284.06 |
| 4,453,980 A | 6/1984 | Ward | | |
| 4,479,827 A | 10/1984 | Ward | | |
| 4,548,650 A | 10/1985 | Kietzman | | |
| 4,600,657 A | 7/1986 | Wegehaupt et al. | | |
| 4,648,985 A * | 3/1987 | Thorsell et al. | ............. | 508/364 |
| 4,661,378 A | 4/1987 | McGovern | | |
| 4,740,322 A | 4/1988 | DiBiase et al. | | |
| 4,786,531 A | 11/1988 | Hodson | | |
| 4,835,014 A | 5/1989 | Roth et al. | | |
| 5,017,230 A * | 5/1991 | Hopkins et al. | ......... | 106/284.3 |
| 5,091,002 A | 2/1992 | Schamberg et al. | | |
| 5,205,860 A | 4/1993 | Narula et al. | | |
| 5,580,603 A | 12/1996 | McGovern | | |
| 5,713,996 A | 2/1998 | Morris et al. | | |
| 5,721,296 A | 2/1998 | Mizunuma et al. | | |
| 5,772,749 A | 6/1998 | Schilling et al. | | |
| 5,928,418 A | 7/1999 | Tamaki et al. | | |
| 6,046,295 A | 4/2000 | Friisch, Jr. et al. | | |
| 6,113,978 A | 9/2000 | Ornstein et al. | | |
| 6,143,812 A | 11/2000 | Martin et al. | | |
| 6,323,268 B1 | 11/2001 | Fisher et al. | | |
| 6,403,163 B1 | 6/2002 | Fisher et al. | | |
| 6,444,258 B1 | 9/2002 | Terry | | |
| 6,451,885 B1 | 9/2002 | Dresin et al. | | |
| 6,506,444 B1 | 1/2003 | Mahr et al. | | |
| 6,786,962 B2 * | 9/2004 | Yap et al. | ................... | 106/277 |
| 2003/0026910 A1 | 2/2003 | Wait | | |

OTHER PUBLICATIONS

Maintentenance and Repair of Asphalt Parling Lots (CL-15), Asphalt Institute.
Jay Romano, Repairing or Replacing Driveways, New York Times.
Asphalt Sealcoat Manufacturers Association, Standard Specifications.
Engineering Brief #46, Jan. 17, 1991.
Choosing a Sealcoating Unit, Seal-Rite found on www.pavementpro.org The National Pavement Contractors Association's site.
The National Pavement Contractors Assoication's Frequenly Asked Sealcoating Questions From the Pavement Pro's at the N.P.C.A. 2000 STAR Inc. and/or the National Pavement Contractors Association. Revised Aug. 24, 2002.
Girish Dubey Hazards of Altering Sealer Mix Designs, Pavement Magazine, Jan. 1998.
Girish Dubey Understanding how sealcoatin works . . . and how it can save you money. Pavement Magazine. Excerpt found on www.pavementpro.org The National Pavement Contractors Association's site.
Preventive Maintenance Planning Asphalt Pavement Condition Survey Guide. Found on www.pavementpro.org The National Pavement Contractors Association's site.
PCTC Guide Specification—PCTC02 Guide for Preparation of Specifications for the Application of A Refined Coal Tar Emulsion with Additves Over Asphaltic Pavements. Found on ww.pavementpro.org. The National Pavement Contractors Association's site.

* cited by examiner

*Primary Examiner*—Gary S. Hartmann
(74) *Attorney, Agent, or Firm*—Sue Z. Shaper

(57) ABSTRACT

A solvent-based solution including methods of making and using for treating and protecting for heavy traffic asphalt pavement, particularly against water-associated problems, such as repeated freeze/thaw cycles, and damage caused by exposure to UV light. The mechanism of protection include an internal coating and partial internal sealing of voids and pores with a special blend of pre-oxidized asphalt emulsion that has been modified with moisture-insensitive silicone-based compounds and surfactants to enhance penetration depth and effectiveness. The sealer works from within the asphalt pavement as well as at the surface. A water-repelling function prevents water from penetrating from the surface while allowing vapor transmission across the pavement through connected voids and capillaries. The sealer should also enhance the bonding strength between asphalt coated particles, thus eliminate chipping. As a result, the sealer should prolong the life of exiting and of new asphalt pavement as well as reduce maintenance cost.

8 Claims, 4 Drawing Sheets

UNIFORM DISTRIBUTION WITH LESS MATERIAL AT THE SURFACE

POOL-FILLING

MECHANICAL BRUSHING MACHINE

CONTROLS
PUMPING SYSTEM
ROTARY BRUSH
SPRAYING BAR

LOW-VISCOSITY, SILICONE-MODIFIED PENETRATING ASPHALT SEALER TO ELIMINATE WATER ASSOCIATED PROBLEMS IN ASPHALT PAVEMENTS

This application claims priority based on co-pending U.S. application Ser. No. 60/569,093, filed May 7, 2004, inventor Radi Al Rashed, of same title.

FIELD OF THE INVENTION

The instant invention relates to low-viscosity, silicone-modified penetrating asphalt sealers, to methods of production thereof and to methods for using the sealers to treat and protect, in particular, heavy traffic asphalt pavement on a large scale against water-associated problems.

BACKGROUND OF THE INVENTION

Introduction

Asphalt pavement, comprising asphalt coated particles bound by the asphalt, is known to be highly porous. The porosity exists in the form of pores connected through capillary channels formed in part during the compaction process. The pores and channels are affected by variations in aggregate size, and are formed in part because of an entrapment of solvent during the curing process. Fatigue caused by expansion and contraction due to heat variation also creates gaps between particles within a pavement matrix. These gaps may develop into cracks if not treated. The oxidation process of asphalt coated particles and the exposure to UV light are also known to cause further damage to bonds between asphalt and aggregate, which damage increases porosity as aggregates at the surface become loose.

The presence of pores and capillaries allows water penetration, a phenomenon that causes additional damage to asphalt pavement. Water reduces the bonding strength between the asphalt and the gravel or any other material under the pavement. Water penetration allows the penetration of chloride ions from deicing salts, a chemical that attacks the asphalt matrix and shortens its life. In addition, freeze and thaw spalling and chipping becomes a problem in asphalt pavement in cold climates because of the fatigue and internal stress build-up due to the expansion of water upon freezing.

More Particularly Asphalt and Water

Water penetration through asphalt pavement may cause severe damage to the bonding strength between asphalt and aggregate. Water penetrates because of its unimpeded ability to move freely through capillaries and connected pores and voids. Typically, asphalt pavement is 13% to 20% voids. The typical aggregate to binder ratio is 10/1.

Because of its ability to move freely through capillaries and connected pores and voids, water causes severe damage to asphalt pavement by several mechanisms. Water or moisture results in a breaking of the bonds between asphalt particles and aggregates. This in turn results in a weakening of the pavement and making it susceptible to problems that lead to a loss in strength and durability. Detachment, wherein a thin film of water results in the separation of an asphalt film from an aggregate surface without breaking the bond, has a high potential because of the ability of water to wet the aggregate surface more than the asphalt binder, due its lower surface tension. This phenomenon generally starts at the surface of the pavement and gradually moves downward as it develops to displacement, a condition where the asphalt film ruptures and the bonds between the asphalt and the aggregate break, which may appear in the form of loose aggregates. See references.

Under wet conditions, repeated traffic and load applications result in the entrapment of water inside tiny pores. The entrapment leads to distress and continued buildup in pore pressure resulting in disrupting the asphalt film from the aggregate surface, which causes the formation of cracks.

In cold climates, where repeated cycles of freezing and thawing occur, asphalt pavement with sufficient moisture is particularly susceptible to additional damage. When the temperature drops below the freezing point ice starts to form within the pores and capillaries of the pavement. Since water volume increases by 9% upon on freezing, if water is confined in the pores between freezing bodies and placed under compression, the pores may dilate causing an increase in the internal stress against the surrounding pavement particles. Repeated freeze and thaw cycles can result in the rupture and deterioration of the asphalt pavement due to fatigue stresses. Such deterioration may appear in the form of cracks and surface spalling. With time, fatigue stress can cause big chunks of the pavement to pop out.

The penetration of water can be greatly influenced by the use of de-icing salts such as sodium chloride granules in cold climates. The concentration of such material within the pavements pores and voids increases with time. The result is an increase in the osmotic pressure, allowing more water to be absorbed under wet conditions at moderate temperatures.

Oxidation of Asphalt

The rate of oxidation of asphalt pavement is highly dependent on the voids in the total mixture. If the voids in the total mixture can be brought below 7–8% in-place, however, then the effect of oxidation will be greatly minimized. During the oxidation reaction, asphalt loses a significant amount of its saturate and aromatic components, which causes the asphalt mixture to stiffen at low temperatures, resulting in further crack formation.

Current Art Techniques

Maintenance of most asphalt pavements involves repairing localized problem areas, such as potholes or badly cracked pavement sections, and in sealing cracks. This type maintenance is needed to prolong the pavement life and to prevent rapid damage to the pavement due to water penetration and other causes. Some problems with asphalt pavement can be prevented or delayed by using good maintenance practices. Currently, there are three different maintenance methods commonly used: rejuvenators, slurry seals, and surface treatments. The choice between the methods mainly depends on the specific project to be maintained.

Asphalt sealers currently available in the market are typically intended for use on low traffic asphalt pavement as a protective seal coat of a film-forming nature, which sealcoat acts as a "barrier coat" to protect the asphalt surface. There are two primary types: those made from refined coal tar and those made from asphalt. Refined coal tar—a by-product of the coking process—is complex mixture of thousands of chemicals and has different molecular structure in general from asphalt. The coal tar molecules have a predominantly closed ring (aromatic) structure with a minor degree of un-saturation. Because of their stable molecular structure, the destructive elements of weather and chemicals do not particularly affect the properties of coal tar. Sealcoatings based on a refined coal tar were introduced in the 1950s and until recently have been used extensively to protect off-street pavements. These sealcoatings often are referred to as C.T.P.E (Coal Tar Pitch Emulsions,) denoting that these coatings are water based, obtained by dispersing refined coal tar in a matrix of clay and water. In recent years, asphalt emulsion-based coatings have been introduced with varying degrees of success. In fact, many sealer manufacturers that previously produced only refined coal tar sealers now also produce asphalt-based sealers or even asphalt/refined coal tar blends. The asphalt emulsion based coatings deliver most of the same properties as refined coal tar-based coatings—except for a resistance to color fading due to ultraviolet degradation and for a resistance to salts and petrochemicals like oils, fats, grease and solvents. These deficiencies are inherent in the asphalt binder itself. Being a petroleum derivative, asphalt has a natural affinity for petrochemicals, so it is easily dissolved by them. Asphalt emulsion-based coatings are made using either a soap emulsion (SS-1-H, for example) or a clay stabilizing emulsion. In recent years, asphalt sealer manufacturers have been quite successful in refining the performance of asphalt emulsion based sealers by using specialty chemicals and pigments. However, the asphalt emulsion-based coatings resistance to petrochemicals and solvents—while improved—has yet to be overcome.

Silicone-based chemicals have been tested and used as additives to asphalt products to enhance the bonding properties between aggregates especially in cold applied patching and repair materials. Ward, Jr. (U.S. Pat. No. 4,373,960, U.S. Pat. No. 4,453,980, and U.S. Pat. No. 4,479,827) utilizes an organopolysiloxane material with non-emulsified asphalt to produce an asphalt-based binder that is to be mixed with pre-heated aggregates prior to application as a patching material for deteriorated pavements. In his inventions, the organopolysiloxane was at most 0.05% by weight, sufficient to enhance the products free flowing properties.

A special blend of topped-coke-oven tar and aromatic solvent was introduced by McGoven (U.S. Pat. No. 4,661,378) as a penetrating sealer and rejuvenator for deteriorated asphalt pavements as well as for concrete surfaces. McGoven claimed that such material might penetrate up to 0.4 inch into asphalt pavement when applied on low-traffic pavement at a rate of 0.13 gallon/square yard. However, for heavy traffic asphalt pavement, such as roads, it had to be mixed with sand, pozzolana, or other fine mineral aggregates, which makes a slurry coat having more body than desired as in the case of conventional slurry-seal materials. A similar form of surface treatment consisting of an asphalt emulsion, diatomite, and sand that can be applied under ambient temperature using conventional paving machinery was invented by Kietzman (U.S. Pat. No. 4,548,650), where the filler diatomite to asphalt ration is in the range of 0.008 to 0.3 by weight. In addition to its overlay uses, Kietzman claimed that this material (with a little modification to improve its abrasion resistance, adhesion/cohesion, and tensile strength) could be used as a protection membrane for bridge decks and roads.

In summary, conventional asphalt sealers currently available in the market have several defects. They are typically surface treatments. In addition to a lack of providing internal protection due to the high viscosity of the surface treatments, which does not allow them to penetrate, they may be considered a non-permanent treatment since they tend to wear-off the surface because of traffic. Because of their film-forming nature combined with their tendency to remain on the surface, these surface treatments cannot be used on roads and highways where slipperiness and skid resistance are of great concern unless they are broadcast with fine aggregates while wet or pre-mixed with fine aggregate in slurry form. This makes the treatment process itself less economical, due to the low coverage rate and frequent shut-down times.

Sealing heavy-traffic asphalt pavements with a penetrating sealer, including an oxidized asphalt cutback that has been modified with a silicone-based compound that permanently provides internal as well as surface protection, to make a heavy-traffic asphalt pavement more durable, has never been taught, disclosed or practiced to applicant's knowledge, prior to the instant invention. There is a need for a new technology that more thoroughly addresses treatment problems for asphalt pavement in a cost-effective mater.

SUMMARY OF THE INVENTION

The present invention discloses a complex solvent-based mixture of several ingredients or active chemicals. The mixture was developed for the purpose of essentially eliminating water penetration into asphalt pavement from the surface, through utilizing a chemical repelling agent, as well as for the purpose of eliminating the transmission of water through the asphalt pavement while allowing vapor transmission (breathing).

The invention is intended for the treatment and protection of heavy traffic asphalt pavement, such as found in bridges, highways, airport runways and taxiways, in a single application that results in an essentially maintenance free and worry free construction when it comes to water, oxidation, and UV problems. The invention should prolong the asphalt service life.

In accordance with aspects of the present invention, there is provided a composition including a well-balanced mixture of ingredients or chemicals for achieving the above objective(s) and solving the above problem(s). Some of the ingredients or chemicals act independently while the rest work in conjunction with each other via chemical reactions to achieve the goal of the treatment.

The chemical and physical functionality of ingredients or chemicals of preferred embodiments of the present invention can be summarized as:

Petrochemically compatible surfactant (Preferably Nonylphenol polyethylene Glycol Ether:) behaves as a wetting agent to reduce the surface tension of the mixture and, thus, to allow the product to penetrate more deeply through capillaries of the pavement.

Preferably an Antifoaming agent (such as isopropyl alcohol): reduces bubble formation and thus tends to eliminate air entrapment within the solution during manufacturing and application.

Active Silicone Compound Providing a Water Repellent and Asphalt Reactant (preferably Methyltrimethoxysilane $(CH_3O)_3SiCH_3$ and/or Dimethyldimethyloxysilicone:) reacts with inherent water to form a siloxane resin which permanently adheres to the surface and inner surface of capillaries and voids, resulting in enlarged asphalt molecules and a significant increase in the surface tension of water, there by inhibiting water from penetrating through remaining capillaries.

Fillers, to fill voids and pores of pavement (preferably a combination of very fine Graphite Powder and oxidized asphalt cutback). Fine graphite powder was found to be very effective (if having a mesh size less than 200) in sealing tiny voids, thus eliminating water from generating high pore pressure under wet conditions. More importantly a highly oxidized asphalt cutback (19K from Lion Oil) was found to be a most suitable filler and oxidized asphalt for this invention.

Petroleum-based solvent as a carrier preferably a Stoddard solvent.

The present invention is recommended for the treatment and protection of large-scale heavy traffic asphalt pavement, mainly bridges, asphalt highways, airport runways, taxiways, and parking garages. Application of the invention is preferably through a spraying and a mechanical brushing mechanism, the spraying mechanism being adequate to spray large areas in a short period of time. The recommended coverage of the invention is 100 to 110 ft²/gallon in a single one-time application. The application may not require more than 1 hour of closure time, since the very low viscosity of mixture allows it to penetrate very quickly leaving only traces at the surface.

BRIEF DESCRIPTION OF THE DRAWINGS

A better understanding of the present invention can be obtained when the following detailed description of the preferred embodiments are considered in conjunction with the following drawings, in which.

Figure 1:
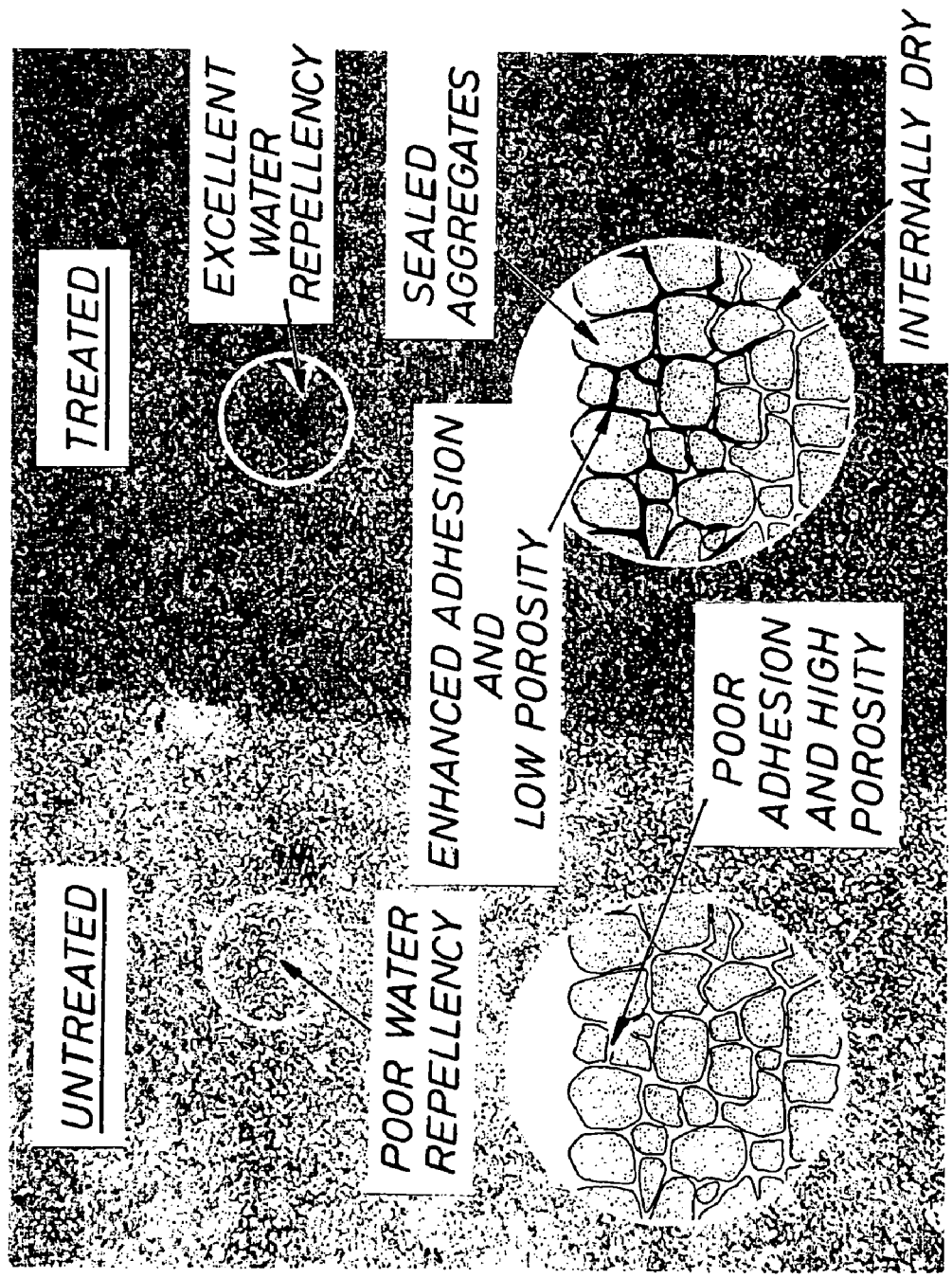
FIGS. 1 and 1A illustrate the invention's performance.
Figure 1A:
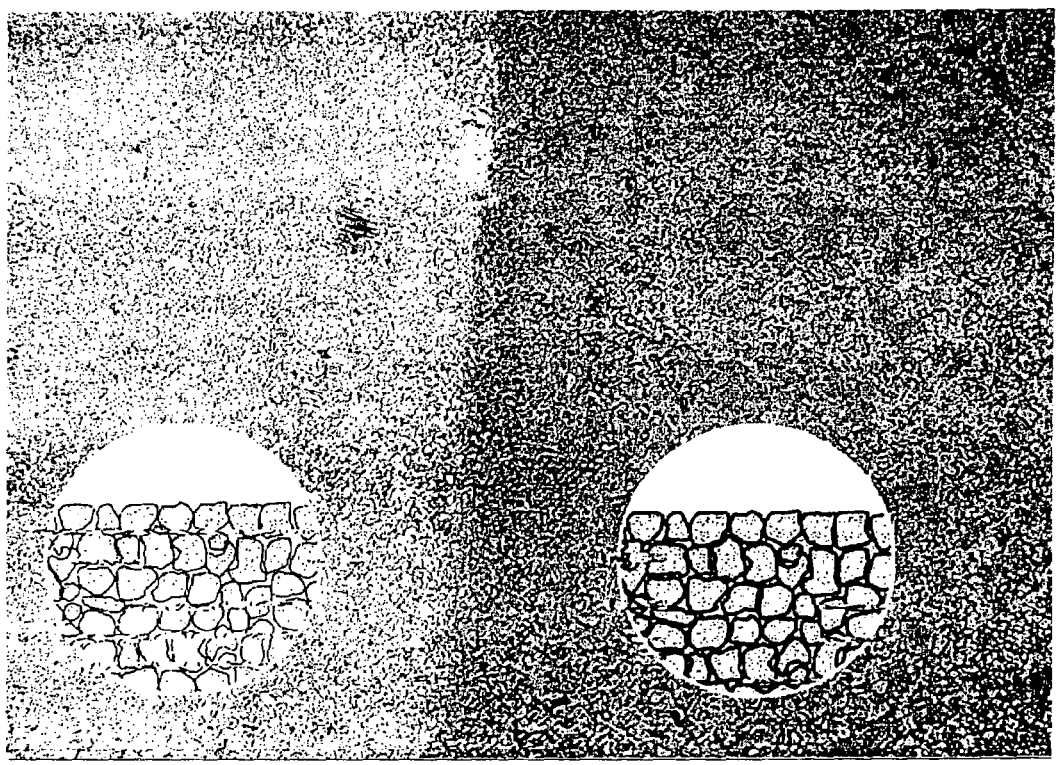

The drawings are primarily illustrative. It would be understood that structure may have been simplified and details omitted in order to convey certain aspects of the invention. Scale may be sacrificed to clarity.

DESCRIPTION OF THE PREFERRED EMBODIMENTS

It has been discovered that an oxidized asphalt cutback provides an excellent filler for an asphalt pavement sealer and treatment material. Preferably the oxidized asphalt cutback is combined with a fine graphite powder to form an emulsion that can lead to a significant reduction in the porosity of asphalt pavement by partially filling the voids and pores of the pavement. When coupled with a formed siloxane resin, the mixture results in strengthening of the adhesion between the existing asphalt material and aggregate as well as between any oxidized bitumen particles, functioning as a substitute for lost aromatic compounds of the pavement. The mixture tends to eliminate further oxidation of the asphalt material. As a result of partially sealing voids and capillaries, some moisture transmission is eliminated. Embodiments of the invention can act as a further moisture barrier by coating the surface of exposed aggregate, preventing moisture from being absorbed therein, especially in the case of limestone aggregate, which is commonly used in asphalt pavements.

A further preferred aspect of the present invention includes an active silicone compound providing a solvent soluble water repellant and asphalt reactant. Preferably the silicone compound includes Methyltrimethoxysilane $(CH_3O)_3SiCH_3$, and/or Dimethyldimethyloxysilane. Methyltrimethoxysilane and Dimethyldimethyloxysilane are chemical monomers that slowly react with water in the pavement and atmosphere to form an invisible film of siloxane resin which permanently adheres to the surface and inner surface of capillaries and voids. Under wet conditions, the siloxane resin functions as a water repellant by significantly increasing the surface tension of water to such a degree that it is essentially impossible for water to penetrate through remaining capillaries of a treated asphalt pavement. As a result, the siloxane resin maintains a dry surface that effectively resists the damage typically caused by freezes and thaws.

The performance of the protection process for preferred embodiments of the present invention is believed to be enhanced by the presence of Nonylphenol polyethylene Glycol Ether as a petrochemically compatible surfactant, by virtue of which the viscosity of the chemical mire can be reduced to about 12% of that of the asphalt cutback itself at room temperature.

Embodiments of the current invention have been tested by Construction Technology Laboratories, Inc. (CTL) to investigate their effect on skid resistance, using two different standard methods. First, the ASTM E303-93 "Standard Test Method for Measuring Surface Frictional Properties Using the British Pendulum Tester" measures the "British Pendulum Number (BPN)." Secondly, the ASTM F609 "Standard Test Method for Static Slip Resistance of Footwear, Sole, Heel, or Related Materials by Horizontal Pull Slip Meter (HPS)" measures the friction coefficient. A sample of the invention was applied to three different areas on an existing asphalt pavement. The tests were performed on those areas as well as on three different areas that were left untreated as controls. Results of both tests indicate that the areas treated with the current invention had British Pendulum Numbers and coefficients of friction comparable to those results obtained from the tests on untreated areas.

A preferred embodiment of a present invention is formulated by combining six different chemicals in a liquid form. To our knowledge, an optimum quantitative chemical composition of the invention can be achieved if the mixture is prepared using the data given in Table 1 on a weight basis. Such a composition will provide a solution of about 55% solids content that has a very low viscosity of 90 centipoises at 77° F. to assure deep penetration.

TABLE 1

Optimum chemical composition of the invention.

| Chemical Name | wt. % |
| --- | --- |
| Graphite Powder (<200 mesh) | 4.055 |
| Oxidized Asphalt Cutback (60% Solids) | 85.230 |
| Isopropyl Alcohol (Anhydrous) | 2.033 |
| Nonylphenol Polyethylene Glycol Ether (pure) | 0.045 |
| Methyltrimethoxysilane $(CH_3O)_3SiCH_3$ | 4.572 |
| Stoddard solvent | 4.065 |
| Total | 100 |

Altering the chemical composition of the above invention by adjusting the weight percentages of one or more of the chemical ingredients, to a certain degree, will not have a great effect on the overall performance of the invention, especially as long as the method of application is adjusted accordingly. For instance, a reduction in the solids content would result in a diluted form of the invention. In such case, the material should be applied to the asphalt pavement at a higher rate.

The overall performance of the invention in treating heavy traffic asphalt pavements should be acceptable if the content of the chemicals remain within the ranges given in Table 2.

TABLE 2

Minimum and maximum weight percentage of chemicals through which the invention will remain effective.

| Chemical Name | Minimum wt. % | Maximum wt. % |
| --- | --- | --- |
| Graphite Powder (<200 mesh) | 0.000 | 8.000 |
| Oxidized Asphalt/Cutback Emulsion (60% Solids) | 75.000 | 90.000 |
| Isopropyl Alcohol (Anhydrous) | 0.500 | 3.500 |
| Nonylphenol Polyethylene Glycol Ether (pure) | 0.001 | 0.200 |
| Methyltrimethoxysilane $(CH_3O)_3SiCH_3)$ | 3.000 | 6.000 |
| Stoddard solvent | 2.000 | 8.000 |

Preferred production processes for the present invention utilize a multi step mixing of the chemicals to minimize interactions that may cause the material to coagulate during manufacturing. For this purpose, a reactor vessel with a high-speed sheer mixer is preferably utilized to maintain the product in an emulsion form, thus minimizing the settling of solid particles.

Although, the invention may also be produced in fewer steps, with certain precautions, to our best knowledge the chemicals are preferably mixed in three different stages for the preferred embodiment. The product of the first stage is called the "Base Emulsion". The product of the second stage is called the "Catalyst". Both the "Base Emulsion" and the "Catalyst" are considered as intermediate products for the purpose making the finished product.

Disclosed below is a preferred procedure as well as, to our knowledge, the best chemical composition for making the preferred embodiment of the invention in its ready-to-use form.

Stage One: Making of the "Base Emulsion"

Batch size=1000 US Gallons, Net weight=7818.9 LB

TABLE 3

Materials required for the manufacturing of a 1000 gallons of Base Emulsion

| Chemical | Weight (LB) |
| --- | --- |
| Oxidized Asphalt Cutback (60% Solids) | 7463.8 |
| Graphite Powder (<200 mesh) | 355.1 |
| Total Weight | 7818.9 |

Mixing Procedure

1. Place the asphalt cutback in the mixing vessel and start the mixer at a medium speed.
2. Add the graphite powder gradually. Do not add more than 20% at a time.
3. Increase the mixing speed to about 1500 rpm and mix for 10 minutes before adding the next portion of the graphite powder.
4. Repeat steps 2 and 3 until all the graphite powder is consumed and continue mixing for 30 minutes.
5. Cover the mixing vessel and allow the material to cool to room temperature and settle for 24 hours before using in the production of the concentrate.

Stage Two: Making of the "Catalyst"

Batch size=1000 US Gallons, Net weight=7449.7 LB

TABLE 4

Materials required for the manufacturing of a 1000 gallons of the Catalyst

| Chemical | Weight (LB) |
| --- | --- |
| Stoddard solvent | 2826.2 |
| Isopropyl Alcohol (Anhydrous) | 1413.5 |
| Nonylphenol Polyethylene Glycol Ether (pure) | 31.3 |
| Methyltrimethoxysilane $(CH_3O)_3SiCH_3)$ | 3178.7 |
| Total Weight | 7449.7 |

Mixing Procedure

1. Place all the Stoddard solvent in the reactor and start the mixer at a low speed.
2. Gradually add the Isopropyl Alcohol and mix for about 10 minutes.
3. Add the Nonylphenol Polyethylene Glycol Ether and mix for 10 minutes.
4. Gradually add the Methyltrimethoxysilane and continue mixing for an additional 15 minutes.

Stage Three: Making of the "Finished Product"

Batch size=1000 US Gallons, Net weight=7777.6 LB

TABLE 5

Materials required for the manufacturing of a 1000 gallons of a Preferred Embodiment of the Invention in its ready-to-use form.

| Chemical | Weight (LB) |
| --- | --- |
| Base Emulsion | 6944.20 |
| Catalyst | 833.37 |
| Total | 7777.57 |

Mixing Procedure

1. Place the exact amount of the Base Emulsion in the mixing vessel and start mixing a medium speed.
2. Weight the exact amount of the catalyst in a separate container then add it in three steps to the mixing vessel. Allow at least 5 minutes of mixing between portions.
3. Increase the mixing speed gradually to 1500 rpm, and mix for 10 minutes.
4. Repack in 5-gallon pails or 55-gallon drums and seal well.

Method Of Application

To our best knowledge, the preferred embodiment of the invention should be applied at a coverage rate of 1 gallon per 100–110 square feet. The preferred method of application, such that the invention can effectively penetrate into the asphalt pavement, would be as follows:

Heavy-Traffic Areas

Figure 2:
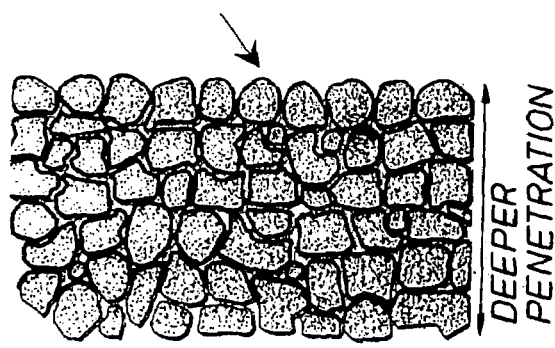
FIG. 2 illustrates application techniques.
Figure 2:
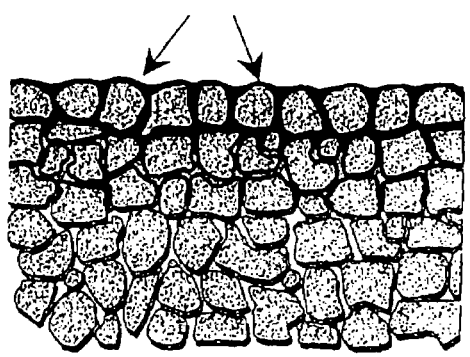

For heavy-traffic asphalt pavement, such as roads, bridges, and highways, the material is best mechanically brushed at the surface, in order to prevent it from accumulating at the surface, especially between surface aggregates. Brushing tends to eliminate the forming of small pools, hence maintaining the slip-resistance of the surface (FIG. 2).

An application machine has been specially designed for this purpose, by which machine a preferred embodiment of invention is sprayed at the surface of the pavement and then forced inside the pavement by a cylindrical brush rotating at a high speed (see below.)

For the invention to effectively penetrate into the pavement, the surface is preferably first cleaned and freed from any contaminants that might block the material from penetrating through the surface openings. The pavement may be cleaned using the same mechanical brushing system in a single pass prior to applying the invention to the surface.

Low-Traffic Areas

For low-traffic asphalt pavement, such as parking garages, sidewalks and driveways, the material can be applied by either spraying or rolling. However, it is preferable that the surface be cleaned first, and dry. Cleaning can be achieved by using high-pressure compressed air, for instance, which removes dust, loose particles and other contaminants that might prevent the invention from penetrating.

Application Machine

Figure 3A:
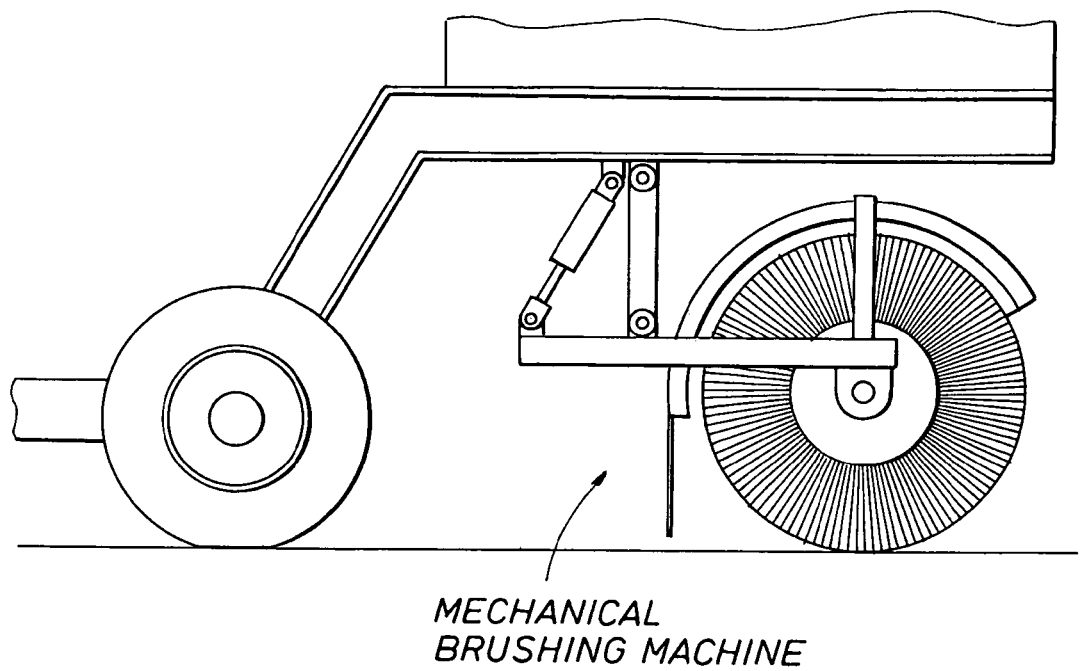
FIGS. 3A, 3B and 4 illustrate an application machine.
Figure 3B:
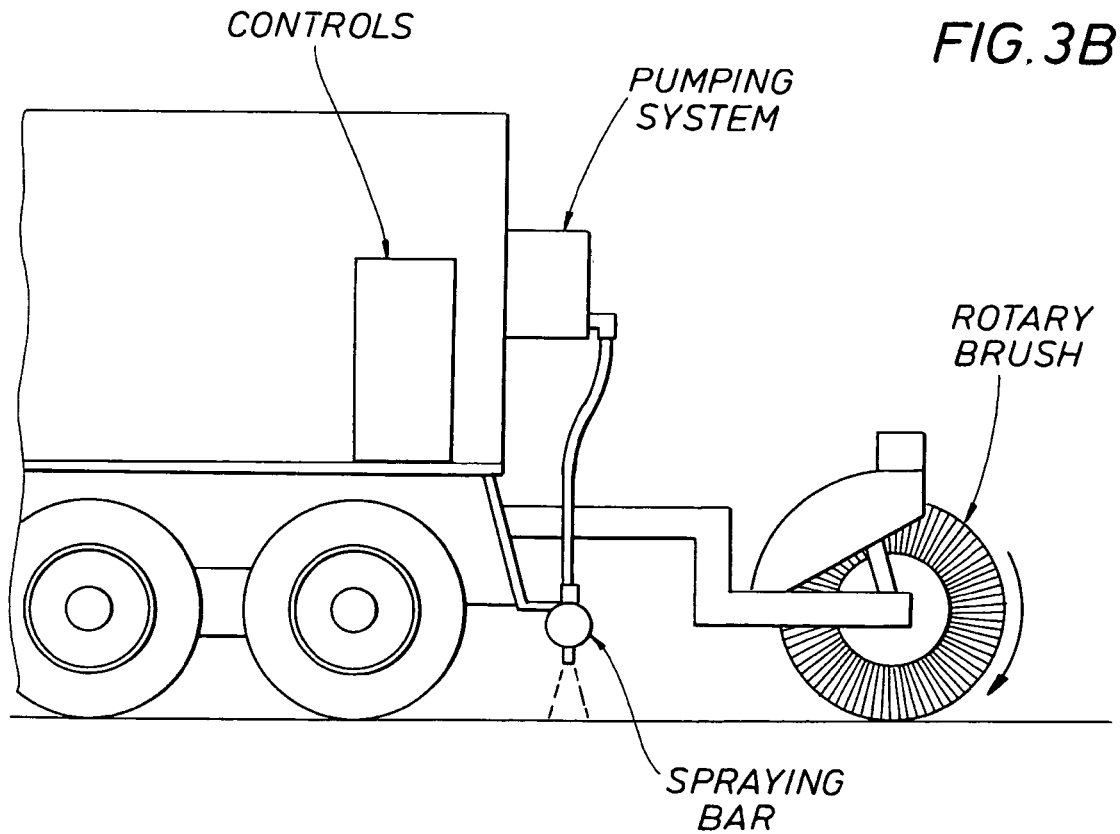

An application machine of a trailer type (FIG. 3) has been specifically designed for the purpose of applying preferred embodiments of the invention on heavy-traffic asphalt pavement, where it efficiently forces more material into the pavement and eliminates accumulation at the surface. It comprises essentially a computerized spraying mechanism and a mechanical brushing system powered hydraulically by a gasoline engine.

As part of the spraying mechanism, a radar sensor is installed to measure speed. The sensor sends a signal to a programmable controller that adjusts the flow rate of the material via a sinusoidal valve as a function of the vehicle speed (2–9 miles/hour), thus maintaining a desired coverage rate through an 8-feet wide spraying bar that uniformly sprays the material through nine evenly spaced nozzles.

The brushing system is hydraulically driven and equipped with a hydraulic load-control to enhance the penetration process by applying pressure at the surface. While rotating at high speed (100–500 rpm) in the opposite direction to the wheels, the bristles of the rotary brush continuously sweep any excess material between surface aggregates and evenly distribute it at the surface.

Figure 4:
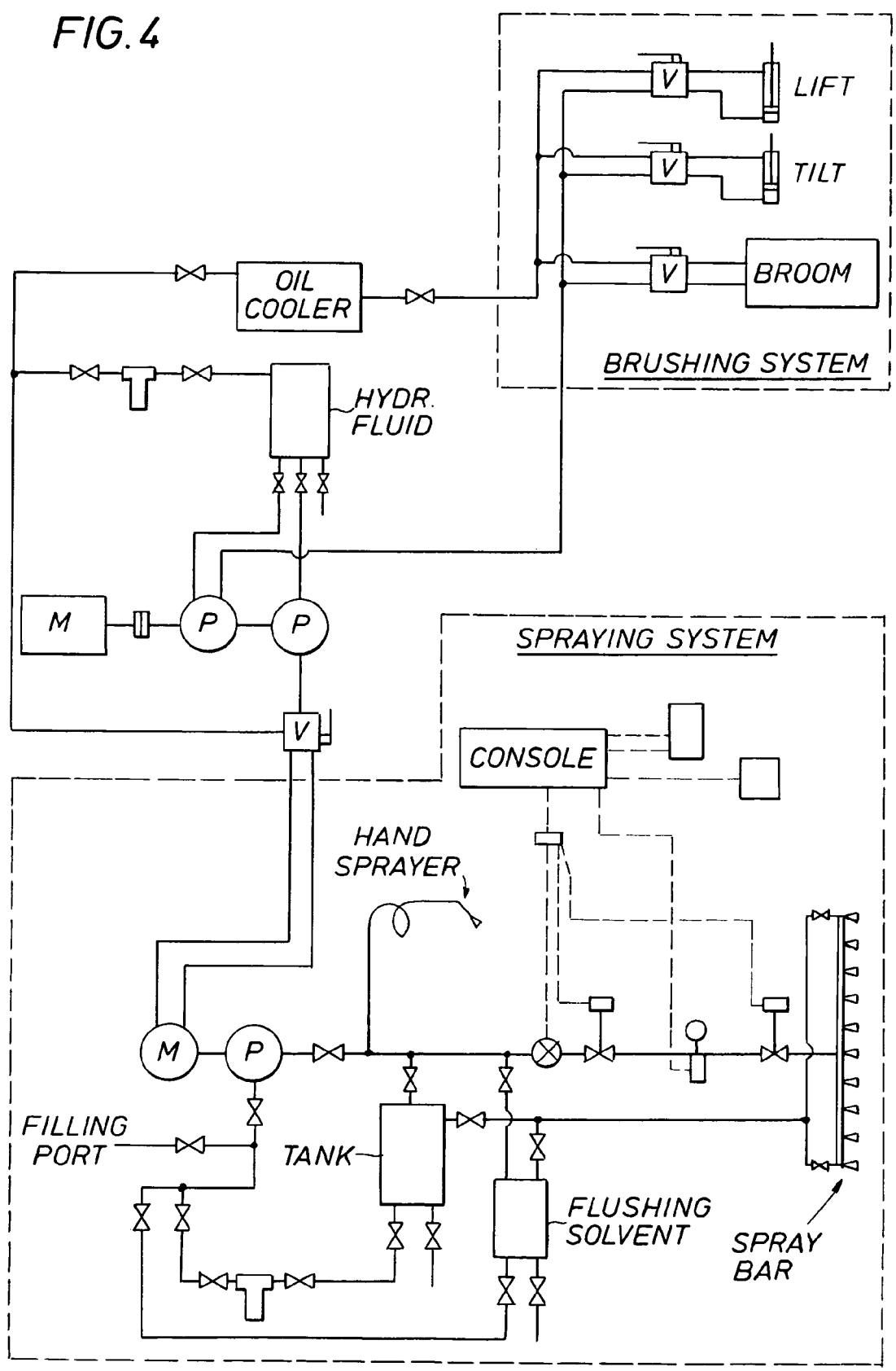

As a maintenance measure, a flushing system can be added to the machine in order to clean the spraying mechanism (pump, valves, and pipes) from any residue after each application, thus preventing clogging. A detailed schematic diagram of the application is illustrated in FIG. 4.

In preferred embodiments of the present invention, these active ingredients and chemicals are combined together through a multi-stage manufacturing process to produce a unique product that is able to solve water-associated problems in asphalt pavement permanently by a double action technique that maintains the pavement essentially internally dry. Although the present invention is of a penetrating nature, its water repelling efficiency exceeds the established federal specifications. Its internal waterproofing technology is superior because it waterproofs internally as well as at the surface.

Once fully cured, the present invention maintains a uniform black color across treated pavement with a non-shine (matt) look that tends to eliminate reflection of sunlight during the day or headlights at night.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

REFERENCES

[1]Majidzadeh, K. and Brovold, F. N., "Sate of the Art: Effect of Water on Bitumen-Aggregates," Special Report 98, HRB, National Research Council, Washington, D.D. (1968)

[2]Fromm, H. J., "The Mechanisms of Asphalt Stripping from Aggregate Surfaces," Proc., Association of Asphalt Paving Technologists, Vol. 43, pp. 191–223 (1974)

[3]Bhairampally, R. K., Lytton, R. L., and Little, D. N., "Numerical and Graphical Method to Assess Permanent Deformation Potential for Repeated Compressive Loading of Asphalt Mixtures," Journal of the Transportation Board, No. 1723, National Research Council, Washington, D.C. (2000)

[4]Mack, C. "Bituminous Materials," Vol. 1, Interscience Publishers, New York (1964)

What is claimed is:

1. A composition for the treatment of asphalt pavement, comprising:
   oxidized asphalt cutback, from between about 75% to about 90% by weight;
   an active silicone compound providing a solvent soluble water repellant, from approximately about 3.0% to about 6.0% by weight; and
   a petroleum based solvent, from approximately 2.0% to approximately 8.0% by weight.

2. The composition of claim 1 that includes fine graphite powder, less than or equal to 200 mesh, up to about 8.0% by weight.

3. The composition of claim 1 that include a surfactant, from about 0.001% to 0.2% by weight.

4. The composition of claim 1 that includes a Stoddard solvent.

5. The composition of claims 1, 2, 3, or 4 that includes an anti-foaming agent.

6. The composition of claim 1 wherein the active silicone compound comprises at least are of Methyltrimethoxysilane and Dimethyldimethyloxysilane.

7. The composition of claim 3 wherein the surfactant comprises Nonylphenol Polyethylene Gylcol Ether.

8. The composition of claim 5 wherein the anti-foaming agent comprises Isopropyl Alcohol.

* * * * *